Patented Aug. 17, 1954

2,686,779

UNITED STATES PATENT OFFICE 2,686,779

PROCESS FOR PRODUCING ALKALI METAL SULFATES OF CELLULOSE, INULIN, DEXTRIN, AND STARCH

Rufus V. Jones, Bartlesville, Okla., assignor to Phillips Petroleum Company, a corporation of Delaware No Drawing. Application July 18, 1949, Serial No. 105,452

16 Claims. (Cl. 260—215)

This invention relates to a process for producing alkali metal sulfates of cellulose, inulin, dextrin, and starch.

This application is a continuation-in-part of my U. S. application Serial No. 46,928, filed August 30, 1948, now abandoned.

Alkali metal sulfates of cellulose, inulin dextrin, and starch of varying degrees of substitution have found numerous applications in the chemical industry, for example, as thickeners for pastes, adhesives, and additives for muds used in the drilling of oil wells.

Heretofore, it has been proposed to manufacture these compounds by reacting all or a portion of the free hydroxyl groups of materials such as cellulose with sulfuric acid and subsequently neutralizing the resulting cellulose sulfuric acid with a suitable base. However, this process has not been satisfactory on a commercial scale due to the degradation of the cellulose by the acid. Since degraded products are often undesirable or unsuited for many uses, a problem has arisen as to how the esterification may be effected without degradation of the cellulose molecules.

In the process described by U. S. Patent 2,033,-787 to Rigby, it is proposed to substitute chlorosulfonic acid for sulfuric acid and carry out the reaction in the presence of pyridine and an inert diluent. The resulting cellulose sulfuric acid is subsequently dissolved or dispersed in water and treated with an aqueous solution of an alkali metal hydroxide to produce the corresponding alkali metal cellulose sulfate. In order to obtain an acceptably undegraded product, it may be necessary to carry out the process at room temperature with a very large excess of pyridine, under which conditions the reaction time may be prolonged to several days or even weeks.

I have discovered a process for the production of alkali metal sulfates of cellulose, inulin, starch, and dextrin wherein degradation is eliminated or substantially completely prevented. According to my process, cellulose, inulin, starch, and dextrin is reacted with solid alkali metal chlorosulfonate in a non-acidic medium and under anhydrous conditions to form the alkali metal sulfate compound directly, without first producing an acid for subsequent neutralization by a base. The solid sulfonate compound is introduced into the reaction vessel beneath the surface of a layer of an inert diluent. A tertiary amine, such as pyridine, is then added to facilitate solvation and to consume hydrogen chloride evolved during the reaction, after which the cellulose, inulin, starch, or dextrin is introduced into the vessel with resultant formation of undegraded alkali metal sulfate of cellulose, inulin, starch, or dextrin in a relatively short reaction period.

It is an object of the invention to produce alkali metal sulfates of cellulose, inulin, starch, or dextrin by a method wherein degradation of the molecules of cellulose, inulin, starch, or dextrin is substantially eliminated.

It is a further object of the invention to provide a process for the production of alkali metal sulfates of cellulose, inulin, starch, or dextrin wherein the reactions are conducted in non-acidic media.

It is a still further object of the invention to interact cellulose, inulin, starch, or dextrin with solid sodium chlorosulfonate in a manner whereby a sodium sulfate of cellulose, inulin, starch, or dextrin of superior quality is obtained as the principal product.

Various other objects, advantages and features of the invention will become apparent from the following detailed description.

Broadly speaking, my process comprises reacting cellulose, inulin, starch, or dextrin under anhydrous conditions with alkali metal chlorosulfonates. Sodium is the preferred alkali metal, although potassium and the other members of the alkali metal group may be used.

Anhydrous conditions are maintained during the reaction by utilizing an inert diluent or blanketing material to exclude moisture and air from the reaction. Suitable blanketing materials are benzene, substituted benzenes such as chlorobenzene and toluene, dioxane and paraffinic hydrocarbons. Also, the cellulose, inulin, starch, or dextrin and other materials should be carefully dried before they are introduced into the reaction vessel.

Although the mechanism of this reaction has not been established, it may be represented empirically by the following equation, which shows the combination of one molecule of sodium chlorosulfonate with a hydroxyl group of one of the anhydro-glucose or anhydro-fructose units making up the molecule of cellulose, inulin, starch, or dextrin:

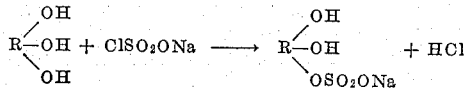

where R represents the portion of the glucose or fructose unit other than the hydroxyl groups.

From this equation, it will be noted that a molecule of hydrogen chloride is produced for each sulfonate molecule, which combines with one of the hydroxyl groups in the glucose or fructose unit. This by-product is continuously removed, as the reaction proceeds, by introducing an effective amount of a tertiary amine into the reaction vessel. The tertiary amine continuously forms an addition product with the hydrogen chloride as it is formed by the reaction and the amines also facilitate solvation of cellulose, inulin, starch, or dextrin. Pyridine is the preferred tertiary amine, although other compounds may be used including quinolines, N,N-dimethyl aniline and alkyl pyridines, such as picolines. In some cases, compounds other than tertiary amines may be used which have a strong affinity for hydrogen chloride and do not react unfavorably with the other compounds.

The quantity of solid alkali metal chlorosulfonate may vary from a small but effective amount to a considerable excess of the sulfonate compound. The preferred range of proportions is from 1 to 4 mols of sulfonate compound per mol of cellulose, inulin, starch, or dextrin. For purposes of this application, the molecular weight of cellulose, inulin, starch, or dextrin is considered to be 162, which is the molecular weight of one of the glucose or fructose units making up the molecule of cellulose, inulin, starch or dextrin. Since each glucose or fructose unit has three reactive hydroxyl groups, it will be apparent that varied degrees of substitution may be obtained by changing the proportion of sulfonate compound within the preferred range. The tertiary amine should be supplied in a ratio of from 2 to 14 mols per mol of sulfonate compound. Thus, the preferred range of the tertiary amine compound is from 2 to 56 mols per mol of cellulose, inulin, starch, or dextrin. The quantity of inert blanketing material may vary considerably but sufficient should be used to completely cover the cellulose, inulin, starch, or dextrin and sulfonate compound. Ordinarily, the quantity of inert diluent varies from about 2 to about 10 parts by weight per part of sulfonate compound.

The sulfonate compound may be obtained from any suitable source or it may be readily prepared by the action of sulfur trioxide with the alkali metal chloride. Care should be taken in storing and handling these compounds to avoid contact with moisture which might lead to hydrolysis and the subsequent introduction of acid materials into the reaction zone.

In practicing my invention, I prefer to place the inert blanketing material or diluent in a reaction vessel and then introduce the requisite amount of sulfonate compound beneath the surface of the blanketing material. The tertiary amine is then introduced at a temperature of about 50 to about 60° F. Thereupon, dry cellulose, inulin, starch, or dextrin is added and the temperature elevated to within a range of 50 to 250° F., preferably from 175 to 225° F. It is desirable that the mixture be agitated as the reaction proceeds and the reaction period should be from 1 to 12 hours, preferably 3 to 6 hours.

When the reaction is completed, the alkali metal sulfate product may be removed and separated from the other components by successive washing with benzene, acetone, and methanol. After the nitrogen compounds and chlorides are removed in this manner, the alkali metal sulfate of cellulose, inulin, starch, or dextrin is freed from solvent and may be used without further treatment. However, if desired, it may be further refined by dispersion in water and reprecipitation with methanol.

The alkali metal sulfate of cellulose, inulin, starch, or dextrin obtained by my process is substantially completely undegraded and no hydrolysis of the product occurs through contact of the starting materials or product with free acid. This results from the use of the alkali metal chlorosulfonate as the principal reactant and from the use of anhydrous materials. Due to the anhydrous conditions, hydrolysis of the sulfonate compound to acidic materials is avoided. In addition, the product is produced by a single reaction and it is not necessary to first produce a sulfuric or sulfonic acid compound and thereafter neutralize this compound with a suitable base. Finally, even though an undegraded product is produced, the reaction time is considerably reduced so that it is suitable for commercial operation.

In accordance with the invention, the alkali metal derivatives of cellulose, starch, dextrin, and inulin may be used as starting materials instead of the pure compounds. Thus, for example, the reaction of sodium cellulose with sodium chlorosulfonate in the presence of pyridine and an inert diluents falls within the scope of the present invention, it being understood that the concentrations of the reactants, time, temperature and other reaction conditions are the same as previously described.

As a specific example, an amount of benzene diluent sufficient to cover one mol of sodium chlorosulfonate was placed in a reaction vessel after which carefully dried sodium chlorosulfonate was introduced beneath the surface of the diluent. Ten mols of pyridine were added to the mixture with the temperature of the system at 50 to 60° F. and then 0.25 mol of cellulose was placed in the vessel. The mixture was stirred at a temperature between 195 and 210° F. and after four hours the reactor contents were discharged on a filter. The light tan residue on the filter was washed with successive portions of benzene, acetone, and finally methanol until nitrogen compounds and chlorides were removed. A portion of the anhydrous product was then dispersed in water. Tests for acidity showed the dispersion to be substantially neutral.

The sodium cellulose sulfate was further refined by dispersion in water and reprecipitation with methanol. Separation was effected by centrifuging. After further washing with acetone and methanol, the snow white sodium cellulose sulfate was dried for storage.

As a second specific example, 138 grams or 1 mol of anhydrous sodium chlorosulfonate were charged to a reactor and 500 grams or 6.4 mols of benzene were added to completely cover the sodium chlorosulfonate. Then, 1,000 grams or 12.6 mols of pyridine were then charged to the reactor, the temperature of the system being between 50 and 60° F. Thereupon, 50 grams or 0.31 mol of starch were added to the resulting mixture and the temperature was raised to a range of 190 and 200° F., with constant stirring, for a period of 8 hours. The reactor contents were then filtered, the light tan residue on the filter being washed with successive portions of benzene, acetone, and methanol to remove nitrogen compounds and chlorides. The washed product was air dried, thus producing 108 grams of product, which was snow white in color. Analysis indicated a minimum degree of substitution of 0.13 sulfate groups per anhydro-glucose unit. The sodium starch sulfate product was then removed to storage.

As a third specific example, an amount of benzene sufficient to cover 1 mol of sodium chlorosulfonate is placed in a reactor after which the carefully dried sodium chlorosulfonate is introduced. Then, 10 mols of pyridine are added, with the temperature of the system between 50 and 60° F. Thereupon, 0.25 mol of inulin is added to the mixture, and an elevated temperature between 190 and 210° F. is maintained for a period of 4 hours. After filtration and washing, of the residue with successive portions of benzene, acetone, and methanol, the sodium inulin sulfate is further refined by dispersion in water and reprecipitation with methanol. After further separation and washing with acetone and methanol, the product is dried for storage.

As a fourth specific example, sodium dextrin sulfate is prepared in the manner described in connection with the preceding specific example, 1 mol of sodium chlorosulfonate, 10 mols of pyridine, and 0.25 mol of dextrin being charged to the reactor in the manner already described. Thereupon, the mixture is heated with constant agitation, and the product is obtained and purified by filtration, washing, and dispersion.

While the invention has been described in connection with a present, preferred embodiment thereof, it is to be understood that this description is illustrative only and is not intended to limit the invention, the scope of which is defined by the appended claims.

Having described my invention, I claim:

1. The process which comprises reacting an alkali metal chlorosulfonate under anhydrous conditions with a compound selected from the group consisting of cellulose, starch, dextrin, inulin and the alkali metal derivatives of said compounds in the presence of a tertiary amine, whereby hydrogen chloride produced by the reaction is continuously absorbed by the tertiary amine and degradation of the selected compound is substantially prevented.

2. The process which comprises charging an inert diluent material into a reaction vessel, then introducing an alkali metal chlorosulfonate beneath the surface of the diluent material, adding an effective amount of a tertiary amine, then adding to the mixture in said vessel a compound selected from the group consisting of cellulose, starch, dextrin, inulin and the alkali metal derivatives of said compounds, and separating the corresponding alkali metal sulfate.

3. The process which comprises charging inert diluent material into a reaction vessel, introducing an alkali metal chlorosulfonate into said vessel beneath the surface of said inert material in the proportion of about 1 to about 4 mols of chlorosulfonate per mole of compound to be treated, introducing a tertiary amine compound into said vessel in the proportion of about 2 to 56 mols per mol of compound to be treated while maintaining a temperature of about 50° F. to about 60° F., introducing into the reaction vessel the compound to be treated, said compound being selected from the group consisting of cellulose, starch, dextrin, inulin and the alkali metal derivatives of said compounds, allowing the reaction to proceed from about 1 to about 12 hours while maintaining a temperature of about 50 to about 250° F., and separating the corresponding alkali metal sulfate.

4. A process in accordance with claim 3 in which the compound to be treated is cellulose.

5. A process in accordance with claim 4 wherein the alkali metal is sodium and the tertiary amine is pyridine.

6. A process in accordance with claim 3 in which the compound to be treated is starch.

7. A process in accordance with claim 6 wherein the alkali metal is sodium and the tertiary amine is pyridine.

8. A process in accordance with claim 3 wherein the compound to be treated is dextrin.

9. A process in accordance with claim 8 wherein the alkali metal is sodium and the tertiary amine is pyridine.

10. A process in accordance with claim 3 in which the compound to be treated is inulin.

11. A process in accordance with claim 10 wherein the alkali metal is sodium and the tertiary amine is pyridine.

12. The process which comprises charging inert diluent material into a reaction vessel, introducing an alkali metal chlorosulfonate into said vessel beneath the surface of said inert material in the proportion of about 1 to about 4 mols of chlorosulfonate per mol of compound to be treated, introducing a tertiary amine compound into said vessel in the proportion of about 2 to 56 mols per mol of compound to be treated while maintaining a temperature of about 50° F. to about 60° F., introducing the compound to be treated, said compound being selected from the group consisting of cellulose, starch, dextrin, inulin and the alkali metal derivatives of said compounds into the reaction vessel, allowing reaction to proceed from about 3 to about 6 hours while maintaining a temperature of 175 to 225° F., and separating the corresponding alkali metal sulfates.

13. A process in accordance with claim 12 in which the compound to be treated is cellulose.

14. A process in accordance with claim 12 in which the compound to be treated is starch.

15. A process in accordance with claim 12 in which the compound to be treated is dextrin.

16. A process in accordance with claim 12 in which the compound to be treated is inulin.

References Cited in the file of this patent

UNITED STATES PATENTS

| Number | Name | Date |
|---|---|---|
| 2,033,787 | Rigby | Mar. 10, 1936 |
| 2,036,423 | Malm et al. | Apr. 7, 1936 |
| 2,138,778 | Rigby | Nov. 29, 1938 |
| 2,240,920 | Werntz | May 6, 1941 |
| 2,560,611 | Wagner et al. | July 17, 1951 |

FOREIGN PATENTS

| Number | Country | Date |
|---|---|---|
| 405,195 | Great Britain | 1934 |